INVENTOR.
HIDEO MORI

United States Patent Office 3,486,008
Patented Dec. 23, 1969

3,486,008
VEHICLE COUNTER AND IDENTIFICATION APPARATUS
Hideo Mori, Woodland Hills, Calif., assignor to Abex Corporation, New York, N.Y., a corporation of Delaware
Filed July 6, 1966, Ser. No. 563,099
Int. Cl. G06f 7/38; G06g 7/00
U.S. Cl. 235—92                                    11 Claims This invention relates to a new and improved automatic vehicle identification system and more specifically to a new and improved vehicle counter that may be incorporated, as a principal control unit, in a vehicle identification system.

There are a number of different proposed systems for automatic vehicle identification, particularly as applied to the identification of railroad cars and other railroad rolling stock. In such systems, some form of identification member is mounted upon each vehicle to be identified by the system. At any desired point that may be traversed by the vehicles requiring identifification, a wayside scanning apparatus is mounted to scan the identification members, sometimes referred to as tags, on the individual vehicles. Direct optical scanning using a light beam has been used in systems of this kind, and radio frequency scanning apparatus has also been utilized. Particularly advantageous systems have been suggested, using microwave scanners, in which each vehicle identification member comprises a plurality of individual microwave reflector elements; typical systems of this kind are described and claimed in United States Letters Patent Nos. 3,247,508, 3,247,509, 3,247,510 and 3,247,514.

In automatic vehicle identification systems it is often desirable to detect passage of vehicles which do not carry identification members, as well as those which do. It is also desirable to afford some means for determining the direction in which a vehicle or group of vehicles (sometimes referred to hereinafter as a cut) moves past the identification point. This is particularly important in those instances in which the vehicle identification members are scanned in the direction of vehicle movement; direction must be ascertained in order to permit consistent reproduction of the identification data with reversal. In most systems, regardless of the direction of scanning of the identification member, there is a requirement for recording of the direction of movement of the vehicles, so that directional information must be derived in any event.

In automated vehicle identification systems it is not usually possible to rely upon consistency of size or construction of the vehicles in controlling operations of the identification system. For example, in railroad systems the lengths of individual cars may vary by a factor of two or even more. In most systems, the most certain and consistent approach to basic control operations is predicated upon sensing of the passage of individual vehicle wheels or axles. Again, however, irregularities are presented. For example, in a railroad system, while it is true that each car or other vehicle is usually provided with just two trucks, located at opposite ends of the vehicle, those trucks may include either two or three axles and the spacing between axles and between trucks may vary to a substantial extent.

It is a primary object of the present invention to provide a new and improved automatic vehicle identification system that is particularly effective in determining the passage of wheeled vehicles along a given path section, which may be a section of a railroad track or a section of a highway or any other like path, and that is effective to distinguish between vehicles bearing individual identification members and other vehicles on which such identification members are missing. A more specific object of the invention is to provide a new and improved vehicle counter apparatus that is relatively inexpensive in construction yet highly efficient in determining the passage of two-truck vehicles which may have a variable number of axles per truck.

Another object of the invention is to provide for accurate and effective determination of the direction of vehicle movement in an automatic vehicle counter apparatus adaptable for use in an automatic vehicle identification system where the number of axles per truck on the vehicles is subject to variation.

Accordingly, the present invention relates to a vehicle counter, particularly useful in an automatic vehicle identification system, for counting vehicles having two trucks each, with each truck comprising no more than $n$ axles, as the vehicles traverse a given path section. A vehicle counter apparatus constructed in accordance with the invention comprises a pair of sensing means, each effective to sense the passage of a vehicle axle, these sensing means being spaced from each other along said path section by a distance greater than the maximum spacing between axles of a single truck but less than the minimum spacing between trucks on the vehicles being identified. The counter apparatus further includes a reversible counter having a capacity of at least $n$ and a unidirectional counter having a capacity of at least $n+1$. The counter apparatus includes direction logic means, coupled to each of the two sensing means, for determining which sensing means is the first to sense the presence of a vehicle axle and thereby establish the direction of movement of a vehicle or cut of vehicles traversing the path section where the sensing means are located. Counter control means are provided, actuated by the direction logic means, for effectively coupling the first sensing means to the reversible counter to cause the reversible counter to count in one direction and for coupling the other sensing means both to the unidirectional counter and to the reversible counter, the latter connection causing the reversible counter to count in the opposite direction from that effected by the coupling to the first sensing means. In addition, the counter apparatus comprises program means including a first signalling means for signalling passage of one vehicle truck whenever the count in the reversible counter is zero and the count in the unidirectional counter is no greater than $n$. The program means further includes reset means for resetting both counters.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 2 is a detailed logic schematic diagram of a more complex vehicle counter apparatus constructed in accordance with the present invention;

Figure 1:
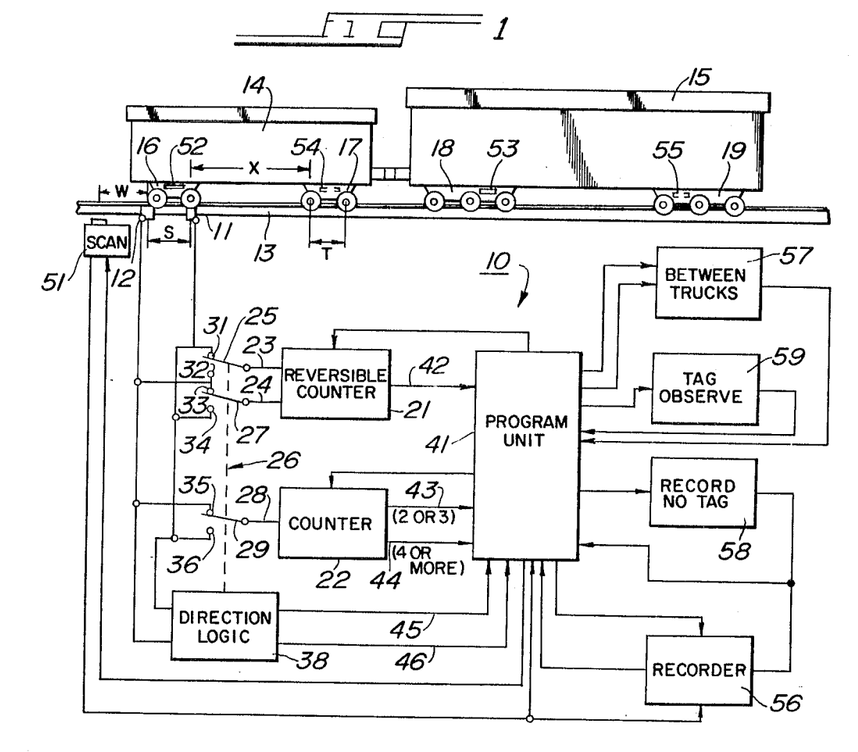
FIG. 1 is a simplified block diagram of a vehicle counter apparatus constructed in accordance with one embodiment of the present invention, together with a simplified illustration of a part of an automatic car identification system with which the counter apparatus is employed.

FIG. 1 illustrates, in block diagram form, a vehicle counter apparatus 10 constructed in accordance with one embodiment of the present invention and applied to the counting of railroad cars as a part of an automatic car identification system. System 10 comprises a pair of individual sensing means 11 and 12 located in spaced relation to each other along a given section of railroad track 13 that is traversed by the railroad, such as the cars 14 and 15, being identified. Car 14 is supported upon two trucks 16 and 17. Each of trucks 16 and 17 is provided with two axles. It may be assumed that the axle spacing T for each of the trucks 16 and 17 is the maximum permitted on the railroad system with which counter apparatus 10 is employed. Moreover, the intratruck axle spacing T is substantially smaller than the minimum spacing X between trucks on any of the railroad vehicles in the system.

Car 15 is substantially different in construction from car 14. It is larger in all dimensions. Moreover, car 15 is provided with trucks 18 and 19 each having three axles. However, the maximum spacing between axles for car 15 is not larger than the spacing T and the spacing between trucks is no smaller than the minimum distance X.

The spacing S between the two sensing means 11 and 12 is made slightly greater than the maximum spacing T between the axles of a given vehicle truck. Each of the sensing means may comprise a conventional flange-actuated track switch. Preferably, magnetic wheel sensing devices of the kind described in the co-pending application of Arthur R. Crawford, Ser. No. 503,479, now Patent No. 3,392,279 filed Oct. 23, 1965 are employed. However, any sensing devices capable of producing a usable pulse signal upon the passage of a vehicle wheel or vehicle axle may be utilized for either one of the two sensing means 11 and 12.

The vehicle counter apparatus 10 further includes two counters 21 and 22. Counter 21 is a reversible counter having a capacity of at least $n-1$ bits, where $n$ is the maximum number of axles per vehicle. In this instance, the reversible counter 21 has a capacity of three bits, although a counter with a capacity of two bits could be employed. Counter 22 is a unidirectional counter having a capacity of at least $n+1$. Preferably, this counter has a capacity of twice the maximum number of axles per truck. For railroad vehicles having a maximum of three axles per truck, the capacity of counter 22 thus would be six.

The reversible counter 21 includes two input circuits 23 and 24 that are employed to actuate the counter for counting in opposite directions. Input circuit 23 is connected to one movable contact 25 of a three-pole double-throw switch 26. The second input circuit 24 to counter 21 is connected to a second pole 27 of switch 26. The input circuit 28 of counter 22 is connected to the third pole 29 of switch 26.

Sensing means 11 is electrically connected to a first fixed terminal 31 for the pole 25 of switch 26. Sensing means 12 is connected to the second fixed contact 32 of this pole of the switch and the first fixed contact 33 in the next pole 27 of the switch. Sensing means 12 is also connected to the first fixed terminal 35 of the third pole of switch 26. Sensing means 11 is also connected to the remaining fixed terminals 34 and 36 of poles 27 and 29, respectively.

Sensing means 11 and 12 are electrically connected to a direction logic circuit 38. Logic circuit 38, as described more fully hereinafter, is employed to determine which of the two sensing means 11 and 12 first senses the presence of a vehicle axle in order to establish the direction of movement of a vehicle cut traversing the section 13 of the railroad track or other path along which the vehicles move. Switch 26 is actuated by the direction logic circuit 38 to change the coupling between the two sensing means 11 and 12 and the two counters 21 and 22 in accordance with the direction of vehicle movement past the counting location. It is not essential that actual direct switching be utilized, as performed by switch 26; instead, solid state logic circuits can be employed for this purpose as described in detail hereinafter in connection with the embodiment of FIGS. 2 and 3.

The output of counter 21, and specifically the "zero" output of the counter, is coupled to a program circuit unit 41. The program means 41 may comprise a diode matrix or other appropriate logic circuitry for determining a variety of operating conditions in accordance with a plurality of different input signals. To this end, the program unit 41 is also provided with two electrical connections from the unidirectional counter 22. The first output connection 43 from counter 22 to program unit 41 affords an input signal to the program unit whenever the count in counter 22 is either two or three. The second connection 44 from the counter to the program unit affords an output signal whenever the count in the counter is four, five or six. The program unit is also provided with two inputs from direction logic circuit 38, a forward signal circuit 45 and a reverse signal circuit 46.

The automatic vehicle identification system in which counter apparatus 10 is incorporated comprises a scanner 51 that is located alongside track 13 a predetermined distance W from the sensing means 12. Scanner 51 is employed to scan individual identification members mounted upon each of the vehicles such as railroad cars 14 and 15. Thus, car 14 bears an identification member 52 that is mounted upon truck 16 and car 15 carries a similar identification member 53 that is mounted upon truck 18. Preferably, each of the cars carries an additional identification member located upon the opposite side of the car but in the same relative position as identification members 52 and 53; these additional identification members are indicated in the drawing by reference numerals 54 and 55.

The arrangement of the identification members on the cars is such that they are scanned during a time interval in which the first truck of a car has passed sensing means 11 and 12 and prior to the time that the second truck of the car reaches the axle sensing means. Thus, the displacement distance W for scanner 51 should be at least equal to and preferably slightly greater than the spacing S between the individual axle or wheel sensing means. On the other hand, distance W should be less than the minimum spacing X between trucks on the cars. Furthermore, if the identification members are located on the left-hand trucks of the cars, then the scanner should be disposed to the left of the sensing means, as illustrated. It will be seen that this location assures scanning of the identification member while the wheel sensing means is at a "between trucks" position regardless of the direction of car movement. On the other hand, if the identification members are located near the right-hand ends of the cars, then the scanner position should be to the right of the wheel or axle sensors.

Scanner 51 is electrically connected to program unit 41. This circuit affords a means for actuating the scanner upon determination of a "between trucks" condition with respect to each vehicle passing sensing means 11 and 12. The output from scanner 51 is supplied to program unit 41 and to a recorder 56 that records identification data with respect to each car and that also records passage of cars that do not bear identification members. Recorder 56 is also provided with two electrical connections to program unit 41. An input signal is supplied to the recorder from the program means to actuate the recorder. This input circuit, which may constitute more than one actual electrical circuit, may also be employed to supply the recorder with information regarding the direction of movement of vehicles past the sensing means 11, 12, and other pertinent information as derived by counter apparatus 10. An output signal from recorder 56 to program means 41 supplies information to the program unit relating to the completion of recording of each car identification, completion of the record with respect to a complete group of cars, and other like information.

As a part of the program means for control apparatus 10, there is a "between trucks" logic circuit 57 that receives input signals from program unit 41 and that supplies signals, under certain conditions, to the program unit. The between trucks logic circuit 57 may constitute a conventional binary flip-flop circuit, as in the specific example described in detail hereinafter in connection with FIGS. 2 and 3. The output signal from circuit 57 is utilized to actuate scanner 51 and recorder 56, under appropriate conditions, for scanning and recording of data from the vehicle identification members such as members 52 and 53.

Another part of the program means for control apparatus 10, which has been illustrated separately from program unit 41, is a "record no tag" logic circuit 58. Input signals are supplied to circuit 58 from program unit 41 to enable that circuit to ascertain the passage of a car that has not displayed an identification member, or tag, to scanner 51. The output signals from the record no tag logic circuit 58 are supplied to recorder 56 to assure a recording of the fact that an unidentified car has passed the scanning station. In addition, the output signals from circuit 58 are supplied back to program unit 41 to assure re-synchronization of the control apparatus 10 in those instances where a car bearing no identification member passes through the system. Circuit 58 may comprise a conventional binary flip-flop circuit.

Another specific circuit that may be incorporated in the program means for control apparatus 10 is a "tag observed" logic circuit 59. Circuit 59 is provided with an appropriate input circuit from program unit 41 and the output is returned to the program unit. Each of the circuits 57, 58 and 59 may be considered as an integral part of the basic program means of control apparatus 10 and this is equally true with respect to the direction logic circuit 38 and the direction control switch 26. Appropriate reset circuit connections are supplied from program unit 41 to counters 21 and 22 to reset the counters for a new cycle of operation.

Before considering operation of control apparatus 10 as illustrated in FIG. 1, it must first be recognized that the spacing between axles on a truck of a given car is not constant. However, as noted above, there is a maximum permissible intra-truck axle spacing T and the distance S between sensing means 11 and 12 exceeds spacing T. It is also possible that the distance between the last axle of a truck on one car and the first axle of a truck of the next vehicle may be equal to or less than the maximum distance T between two axles on a single truck. Thus, sensing means 11 and 12, considered separately, may not be able to distinguish between the axles of the two adjacent trucks (e.g. trucks 17 and 18) of two vehicles that are coupled together. Counter apparatus 10, however, distinguishes between all of these varying conditions to afford a complete and accurate count of vehicles passing sensing means 11 and 12.

Assuming that cars 14 and 15 are moving from right to left, as viewed in FIG. 1, the first wheel on truck 16 is first sensed by sensing means 11. The output signal from sensing means 11 is supplied to direction logic circuit 38 and actuates the direction logic circuit to cause that circuit to throw switch 26 to the position illustrated in the drawing. The output signal from the sensing means 11 is thus supplied to input circuit 23 of counter 21 and causes the reversible counter to count up one count.

Subsequently, the second wheel of truck 16 passes over sensing means 11 and produces a second output signal at the sensing means. This second output signal is again supplied to input 23 of counter 21 and the counter reaches a count of two. Because the spacing S between sensing means 11 and sensing means 12 is greater than the maximum displacement T between the truck axles, both wheels of truck 16 pass sensing means 11 before either reaches sensing means 12.

Shortly after the second wheel of truck 16 passes sensing means 11, the first wheel of the truck reaches sensing means 12. The output signal from sensing means 12 is supplied to input circuit 24 of counter 21, through pole 27 of switch 26, and causes the reversible counter to count down one count. The same signal from sensing means 12 is supplied to counter 22 and causes the unidirectional counter to count up one count. Thus, the count in counter 21 is now one and the count in counter 22 is one. Thereafter, the second wheel of truck 16 passes sensing means 12, supplying a signal to each of counters 21 and 22. This signal causes reversible counter 21 to count down one step to zero and causes unidirectional counter 22 to count up an additional count to a total of two. On the first car, this establishes the initial condition for determination of the end of the first truck of a car. That is, there is an output signal on circuit 42 indicating a zero count in counter 21 and there is an output signal on circuit 43 indicating a count of two for counter 22. These conditions are reflected in signals supplied to the between trucks logic circuit 57, which produces an output signal indicative of a "between trucks" condition. This signal is employed to actuate scanner 51 and to condition recorder 56 for operation.

Before identification member 52 reaches the position for scanning by the scanner 51, it may be desirable to record a heading in recorder 56. In a typical system, the heading or preamble may identify the location of the scanner 51 and may also identify a central control location to which data recorded in recorder 56 are to be transmited. The heading may further include a message number, date, time, and other like information. Usually, the recorder 56 should also record the direction of movement of the car 14 presently being sensed, which will be equally applicable to the remaining cars in the cut. Completion of recording of this preliminary information may be signalled to program unit 41 by the output of recorder 56.

Shortly after the second wheel of truck 16 passes the second sensing means 12, identification member 52 begins to move past the focus of scanner 51. With recording of the heading complete, and the recorder 56 still conditioned for operation, the identification member is scanned and the information derived therefrom is supplied to and recorded in recorder 56. Upon completion of this recording operation, an output signal is supplied from recorder 56 to program unit 41 to re-synchronize counters 21 and 22. If there has been no error in operation, reversible counter 21 does not require resetting. However, unidirectional counter 22 is reset to zero, ready to count the wheels on the next truck.

Continued movement of cars 14 and 15 to the left, as seen in FIG. 1, next brings the first wheel of truck 17 into alignment with sensing means 11. At this time, if scanner 51 has not detected an identification member 52 on car 14, as, for instance, if the identification member had been removed or displaced from its normal position, the failure to record a car identification is detected in program unit 41 from the information furnished to the program unit by scanner 51 and recorder 56. When this occurs, unidiretional counter 22 is reset to zero. Furthermore, a "record no tag" signal is produced by circuit 58 to actuate recorder 56 and record the fact that an unidentified car is passing through the system.

After the first truck on the first car, assumed to be car 14, has passed sensing means 11 and 12, counter apparatus 10 determines the passage of the first truck of each succeeding car in accordance with two distinctive operating conditions. The first of these conditions occurs if the spacing between the last axle of a car and the first axle of the next car is substantially greater than the intra-truck axle spacing T, as in the case of the cars illustrated in FIG. 1. Under these circumstances, a "between trucks" condition is determined whenever the reversible counter 21 has twice counted up to two or three and back to zero and the count in unidirectional counter 22 has twice reached a total count of either two or three. For cars 14 and 15, the "between trucks" condition for car 15 would be determined after counter 21 has first counted up to two and back down to zero with appropriate signals being supplied to program unit 41 through circuits 42 and 43, the count from counter 22 being two in this instance. This combination of signals does not produce a "between trucks" signal; circuit 57 is now conditioned to wait for the passage of two trucks. For truck 18 of car 15, reversible counter 21 counts up to three and back down to zero and unidirectional counter 43 reaches a count of three. This set of signal conditions, following the signals developed by the passage of truck 17, signals that the system is again in a "between trucks" condition and again actuates scanner 51 and recorder 56 to read and record the data from identification member 53.

On the other hand, and as noted above, it may happen that the spacing between the end axle of truck 17 and the lead axle of truck 18 is less than the maximum intra-truck axle spacing T. When this occurs, reversible counter 21 counts up to two and down to zero but subsequently counts up to three and back down to zero while a total count of five is being recorded in unidirectional counter 22. This produces output signals on circuits 42 and 44 indicating a count of zero in the reversible counter and a count in excess of three in the unidirectional counter. These signals indicate a "between trucks" condition which is recognized by circuit 57 and used to actuate scanner 51 and recorder 56. As before, recording of the data from the identification member 53 of car 15 signals the necessity for re-synchronization of the system. That is, for each car the system is re-synchronized to a "between trucks" status in each instance when an identification tag or member is read and in each instance when a combined second truck and following first truck are detected by the sensing means 11 and 12.

System operation continues as described above until complete information is ascertained and recorded with respect to a full train or other cut of cars passing through the system. From the foregoing description it will be seen that the principal requirement for the logic is that a signal be provided that is true from the ending of a first truck on each car to the beginning of the last truck on the car. This signal, the "between trucks" signal produced by circuit 57, can be used to check for the existence of an identification tag on each car. Of course, a simple counter can be actuated by the same signal to give an accurate recording of the total number of cars. The other circuits of the system, including particularly circuit 58, provide for accurate recording of passage of cars that do not bear identification members.

The logic circuitry employed assures continuing synchronization of the system, which is quite essential. If re-synchronization is not effected on a regular and adequate basis, the counter apparatus may interpret the location between the last truck on one car and the first truck of a following car as a "between trucks" condition. Without re-synchronization, this error could continue throughout the remainder of the train and could result in complete failure of the automatic identification system in which the counter apparatus is incorporated. Effective operation of the system is based upon re-synchronization to the "between trucks" condition every time an identification member is read and every time the combination of a last truck and following first truck is sensed. The end of a train or cut of cars is readily determined by an appropriate time delay device, incorporated in program unit 41, that is initiated in action at the end of each second truck and that is reset if additional axles are sensed before it times out.

Figure 3:
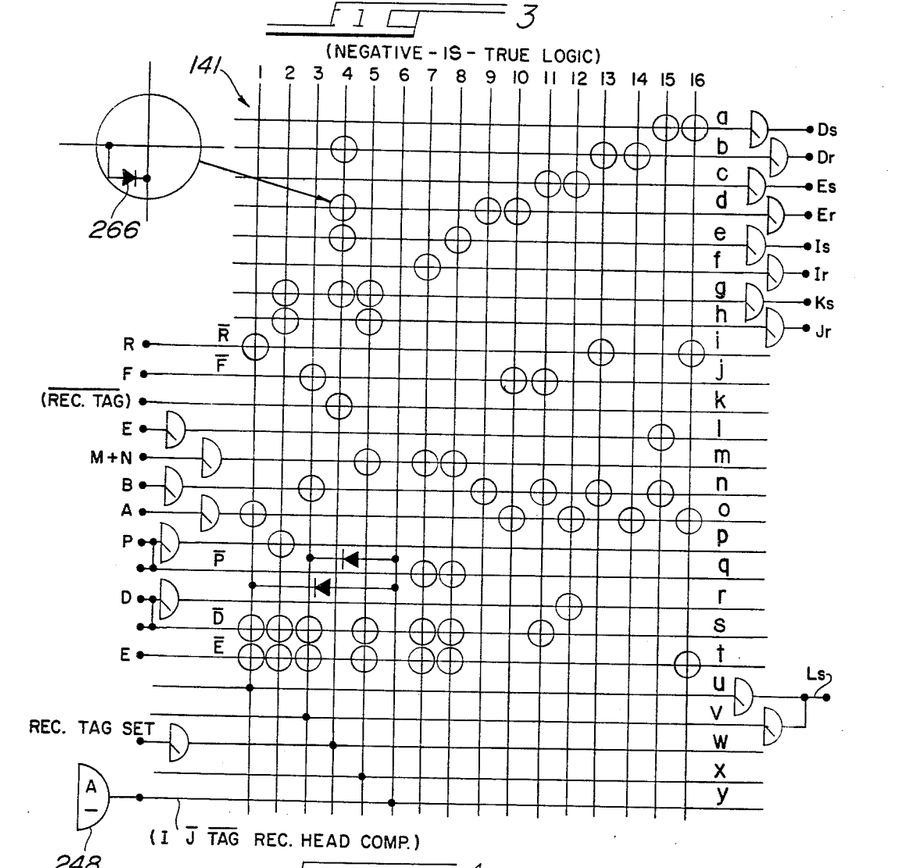
FIG. 3 is a detail circuit diagram of a program matrix incorporated in the vehicle counter apparatus of FIG. 2.
Figure 4:
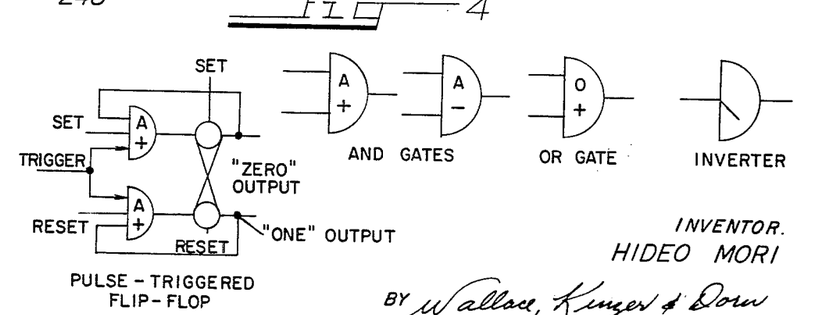
FIG. 4 is an exemplanatory illustration of logic symbols employed in the logic circuit diagram of FIG. 2.

FIGS. 2 and 3 illustrate a counter apparatus 110 that is essentially similar to the counter apparatus 10 described above in connection with FIG. 1 but that is somewhat more sophisicated and complex in its construction and operation. FIG. 4 illustrates, with explanatory legends, the symbols that are used in the logic diagram of FIG. 2. In FIG. 2, the reference numerals employed for major units correspond to those units in FIG. 1 except for the addition of the numeral "1" as a prefix. Thus, the sensing means 11 of FIG. 1 corresponds essentially to the sensing device 111 in FIG. 2, etc.

As in the previously described system, the counter apparatus 110 of FIG. 2 comprises two axle sensing means 111 and 112. Sensing means 111 includes a magnetic pick-up coil 201 that produces an output pulse signal each time a vehicle wheel passes the coil. The sensing device further comprises a pulse generator circuit including two pulse-triggered flip-flop circuits 202 and 203. The output signal from coil 201 is supplied to a first AND circuit 204 comprising the set input for flip-flop circuit 202. The same signal is supplied, through an inverter 205, to an AND circuit 206 constituting the reset input for trigger circuit 202. The "zero" output of flip-flop 202 is connected back as an input to AND circuit 204 and the "one" output of the flip-flop is connected back as an input to AND circuit 206. In addition, each of the AND circuits 204 and 206 is provided with a pulse synchronizing input from an appropriate source, indicated in FIG. 2 as a one hundred kilocycle clock pulse source.

The "one" output for flip-flop circuit 202 is connected to an AND circuit 207 constituting the set input of trigger circuit 203. The reset input is a second AND circuit 208. The "zero" output of the flip-flop circuit is again connected back to AND circuit 207 and the "one" output is connected back to the reset input, AND circuit 208. The two flip-flop circuits afford a pulse generating and shaping circuit that produces a pulse output signal A of predetermined amplitude and duration in response to each initial pulse signal developed by the magnetic sensing coil 201.

The second sensing means 112 of counter apparatus 110 is essentially similar to sensing device 111. It includes a pick-up coil 211 that is coupled to a first pulse triggered flip-flop circuit 212. Trigger circuit 212 is in turn connected to a second pulse triggered flip-flop 213, the circuit arrangement being exactly as described above for circuit 111. The output signal B from device 112 is, therefore, an appropriately shaped signal of constant amplitude that recurs each time a vehicle wheel passes the pick-up coil 211. In the circuit arrangement of FIG. 2, the signals A and B are supplied directly to the terminals A and B of a program unit 141 instead of to the counters of the apparatus, although the basic system operation is essentially the same as is described in detail hereinafter.

Like counter apparatus 10, the counter apparatus 110 illustrated in FIG. 2 includes a reversible counter 121 and a unidirectional counter 122. Reversible counter 121 includes a pair of pulse triggered flip-flop circuits 220 and 221. The set input of trigger circuit 220, comprising an AND circuit 222, is connected to one output terminal $D_s$ of program unit 141. The reset input of trigger circuit 220, comprising an AND circuit 223, is connected to another output terminal $D_r$ of the program unit. Each of the AND circuits 222 and 223 receives a synchronizing clock signal from the one hundred kilocycle source that provides for timing in counter apparatus 110. Moreover, the "zero" output and "one" output of the flip-flop are again connected back to the set and reset inputs, respectively, of the circuit.

The initial flip-flop circuit 220 in counter 121 is not connected directly to the second flip-flop 221 of the counter. Instead, an output signal D is taken from the "one" output of flip-flop circuit 220 to an input terminal D of program unit 141. The set and reset signals for the second stage flip-flop 221 of the counter are derived from output terminals Es and Er of the program unit, these terminals being connected to the set and reset inputs comprising AND circuits 224 and 225 respectively. The construction of flip-flop circuit 221 is otherwise identical to flip-flop 220. Again, the output from the flip-flop circuit is taken from its "one" output terminal and this is connected to an input terminal E in program unit 141.

The unidirectional counter 122 of counter apparatus 110 comprises three individual pulse-triggered bistable trigger circuits 230, 231 and 232. The initial stage of the counter, comprising flip-flop 230, includes a first AND circuit 233 constituting the set input to the flip-flop and a second AND circuit 234 that is the reset input. The set and reset input circuits 233 and 234 are each electrically connected to the B output of flip-flop circuit 213 in sensing device 112. As with the other counter circuits, the "zero" and "one" output terminals of flip-flop 230 are connected back to the set and reset inputs, respectively. Moreover, each of the two input AND circuits 233 and 234 is provided with a synchronizing signal input from the clock circuit. The "one" output of flip-flop circuit 230 is connected to the M input terminal of an OR circuit 235 that is in turn connected to an $M+N$ input terminal of program unit 141.

The "zero" output of flip-flop circuit 230 is directly connected to two AND circuits 236 and 237 that constitute the set and reset inputs, respectively, for the second stage flip-flop circuit 231 in counter 122. There is no necessity for a clock signal connection to AND circuits 236 and 237. The construction of circuit 231 is otherwise identical with circuit 230. The "one" output of the flip-flop is connected back to a second input terminal N of OR circuit 235.

The "zero" output of flip-flop circuit 231 is electrically connected to two AND circuits 238 and 239 constituting the set and reset inputs, respectively, for flip-flop 232. Circuit 232 is essentially identical with circuit 231, as described above. The output signal from circuit 232 is derived from its "one" output, which is connected to an input terminal P of program unit 141.

In counter apparatus 110, the direction logic circuit 138 comprises two interlocked binary flip-flop circuits 241 and 242, each having just one input circuit. The input to trigger circuit 241, which is the "forward" circuit of the direction logic unit 138, comprises an AND circuit 243 which requires three coincident inputs to effect a change in its state of operation. The first of these inputs is the A signal from sensing means 111, derived from the "one" output of flip-flop circuit 203. The second input is taken directly from the "zero" output of flip-flop circuit 241. The third input to AND circuit 243 comes from the "zero" output of flip-flop circuit 242.

Similarly, the reverse direction flip-flop circuit 242 includes but a single input comprising the AND circuit 244. The first of the three inputs to AND circuit 244 is the B signal from sensing device 112. The second input is taken from the "zero" output of flip-flop circuit 242 and the third input to AND circuit 244 is derived from the "zero" output of circuit 241. It is thus seen that the two bistable circuits of the direction logic unit 138 are interlocked with each other and that only one of these flip-flop circuits can produce an output signal on its "one" output at any given time. The "one" output of the forward trigger circuit 241 is electrically connected to an input terminal F of program unit 141. A similar connection is taken from the reverse flip-flop circuit 242 to the input terminal R of program unit 141.

The "between trucks" logic circuit 157 of counter apparatus 110 again comprises a pulse triggered flip-flop circuit essentially similar to the counter flip-flops described above. The set input of trigger circuit 157 comprises an AND circuit 246 requiring three coincident inputs in order to trigger a change in the circuit. One of these inputs is a synchronizing signal derived from the clock circuit. A second is a feedback circuit from the "zero" output of the flip-flop. The triggering input signal is derived from an output terminal Is of the program unit 141 that is connected to AND circuit 246.

The reset input for the between trucks flip-flop 157 comprises a similar AND circuit 247. AND circuit 247 is a first input connection from the clock circuit, a second input connection from the "one" output of the flip-flop circuit, and a third input from terminal Ir of program unit 141. The output signal that is derived from the between trucks logic circuit 157 is taken from the "zero" output of the circuit and is indicated in FIG. 2 to comprise the signal $\overline{I}$. This signal is connected to one input of an AND circuit 248 that is in turn connected to program unit 141.

The "record no tag" circuit 158 of counter apparatus 110 comprises a pulse triggered flip-flop circuit having an AND circuit 251 in its set input and an AND circuit 252 as its reset input. AND circuit 251 requires three coincident input signals to trigger the record no tag flip-flop 158 from one stable state to another. One of these inputs is the clock signal. A second is derived from the "zero" output of the flip-flop. The third and triggering input is taken from an output terminal Ls of program unit 141.

AND circuit 252 similarly requires three input signals in time coincidence with each other. One of these signals is taken from the "one" output of the flip-flop. The second is derived from the recorder circuitry of the car identification system in which the counter appaartus is incorporated and is a synchroning clock signal. The third input to AND circuit 252 is also taken from the recorder and is identified in FIG. 2 as a record last point signal. This signal occurs upon recording of the last unit of an identification member or other identification data by the recorder and signifies completion of a recording entry. The output or record no tag signal is taken from the one output of flip-flop circuit 158.

The tag observed circuit 159, in the embodiment of FIG. 2, constitutes a pulse triggered bistable circuit having two AND circuits 253 and 254 as its set and reset inputs, respectively. AND circuit 253 receives a synchronizing signal input from the clock source. A second input to AND circuit 253 is derived from the "zero" output of flip-flop 159. The third and triggering input signal is a "tag" signal signifying that the shift register for the automatic vehicle identification system in which counter apparatus 110 is incorporated has filled and thus identifies the completion of detection of the identification information for one car or other vehicle.

The reset input AND circuit 254 also receives a synchronizing signal from the clock source. A second input to AND circuit 254 is derived from the "one" output of flip-flop 159. The triggering reset input is derived from an output terminal Jr of program unit 141. The tag observed output signal is derived from the one output of flip-flop circuit 159, which is electrically connected to the J input terminal of AND circuit 248 for program unit 141.

An additional trigger circuit 161 is incorporated in counter apparatus 110 and controls reset operations for counter 122. Trigger circuit 161 is a one shot circuit, the set input of which comprises an AND circuit 255. AND circuit 255 is provided with a clock signal input and has a second input derived from the "zero" output of the trigger circuit. The actuating signal is supplied to AND circuit 255 from an output terminal Ks of program unit 141. A second AND circuit 256 is utilized to reset circuit 161 after a single cycle of operation. AND circuit 256 is provided with only two inputs, one from the clock source and the other from the "one" output of the trigger circuit. The reset signal K derived from the "zero" output of trigger circuit 161 is connected directly to each of the three stages 230, 231 and 232 of counter 122 to reset the entire counter.

As noted above in connection with the description of counter apparatus 10, it is necessary for the direction logic to remain in a given operating condition indicative of a specific direction of movement of the cars throughout the identification and counting operation. In apparatus 110, this is accomplished by means of a train presence logic circuit 162.

The train presence logic circuit 162 comprises a one shot flip-flop having an OR circuit 261 as its input. There are two input connections to OR circuit 261, one taken from the A signal output of sensing means 111 and the other from B signal output of sensing means 112. The output of the flip-flop circuit comprises an inverter 262 that is connected to the operating coil 263 of a relay 264, the coil 263 being returned to an appropriate DC supply designated in the drawing as B—. Preferably, a slow-release relay is used. The contacts 265 of relay 264 are electrically connected in an operating circuit that comprises a set input for each of the two forward and reverse flip-flop circuits 241 and 242 of direction logic 138. Circuit 162 may include one or more stages of amplification; in this circuit unit and in all of the others of FIG. 2, amplifier stages have been omitted from the drawing because they do not modify the function of the apparatus and because amplifier requirements can be readily determined by any worker of ordinary skill in the art.

The operation of counter apparatus 110 of FIG. 2 can only be understood on the basis of a full consideration of the construction and operation of program unit 141. The program unit, in one typical construction, is illustrated in detail in FIG. 3. As shown therein, the program unit is a conventional diode matrix comprising a multiplicity of vertically extending conductors and a multiplicity of horizontally extending conductors that are connected to each other only at the point specifically indicated in the drawing. The inter-conduction connection, in each instance comprising a diode, is illustrated in FIG. 3 by a circle encompassing the point of coincidence of the connected conductors. The kind of connection employed is specifically illustrated by the diode 266 in the enlarged illustration of a single matrix junction at the right-hand side of FIG. 3.

In FIG. 3, all of the input terminals to program unit 141 are shown at the left-hand side of the diode matrix and all of the output terminals are located along the right-hand side of the matrix, thus following the pattern established in FIG. 2. The terminal designations in FIG. 3 are the same as in FIG. 2, although it has not been possible to maintain the exact same positions for individual terminals. In considering operation of program unit 141, as specifically illustrated in FIG. 3, it is necessary to note that program unit diode matrix is constructed on the basis of negative logic; that is, signals of negative-going polarity are taken as true in the logic matrix and positive-going signals are ineffective. This is in contrast with the logic arrangement utilized in FIG. 2 itself, in which positive-going signals are treated as "true" signals.

With the foregoing considerations in mind, it can be seen from FIG. 3 that the various output signals from the program unit can be expressed, in Boolean notation, as follows:

$Ds = (\overline{R} A \overline{E}) + (E B)$
$Dr = (A) + (\overline{R} B) + \text{REC. TAG SET}) (\overline{\text{REC. TAG}})$
$Es = (A D) + (\overline{F} B \overline{D})$
$Er = (\overline{F} A) + (B) + (\text{REC. TAG SET}) (\overline{\text{REC. TAG}})$
$Is = (M+N) (\overline{P} \overline{D} \overline{E}) + \text{REC. TAG SET}) (\overline{\text{REC. TAG}})$
$Ir = (M+N) (P \overline{D} \overline{E})$
$Ks = (M+N) (\overline{D} \overline{E}) + (\text{REC. TAG SET}) (\overline{\text{REC. TAG}})$
$\quad + (P \overline{D} \overline{E})$
$Jr = (M+N (\overline{D} \overline{E}) + (P \overline{D} \overline{E})$
$Ls = (\overline{E} \overline{D} A \overline{R} I \overline{J} \overline{\text{TAG}} \text{ REC. HEAD COMP.})$
$\quad + (\overline{E} \overline{D} B \overline{F} I \overline{J} \overline{\text{TAG}} \text{ REC. HEAD COMP})$ In considering operation of the counter apparatus 110 as illustrated in FIGS. 2 and 3, it may first be assumed that the system is energized, producing a pulse signal upon the "turn on" circuit 271. The "turn on" signal sets each of the two binary circuits 220 and 221 of the reversible counter 121 to the "zero" condition. This same signal sets the "between trucks" flip-flop circuit 121 to the "zero" condition, producing an $\overline{I}$ signal that is supplied to AND circuit 248. The "turn on" signal further sets the "tag observed" circuit 159 to its "zero" condition. The "turn-on" signal also actuates trigger circuit 161 to its "zero" condition, producing an output pulse signal on line K. The signal K is supplied to each of the three counter flip-flops 230–232 in the unidirectional counter 122 and resets all stages of this counter to zero. Flip-flop 161 is reset to its "one" condition on the next cycle of the clock signal. The other flip-flop circuits remain in the "zero" state, each with a negative signal on the "one" output and a positive signal on the "zero" output terminal (see FIG. 4). The terms "positive" and "negative" are used, throughout this specification, in a relative sense, and do not necessarily refer to a ground plane.

From the foregoing, it may be seen that the signal conditions within program matrix 141, FIG. 3, when the counter apparatus 110 is first energized, are E on line $l$, M+N on line $m$, $\overline{P}$ on line $p$, P on line $q$, $\overline{D}$ on line $r$, D one line $s$ and E on line $t$. With these signal conditions in effect, operation of the counter in response to passage of a vehicle can be considered.

As in the example given above, it may be assumed that the first wheel on the first truck of the first car initially comes into alignment with pick-up coil 201 and hence is sensed by the axle sensing means 111, producing a pulse output signal on the A output of that circuit. The A pulse signal actuates trigger circuit 162, through OR circuit 261, energizing the operating coil 263 of the train presence relay 264. Contacts 265 close, effectively setting both of the flip-flop circuits 241 and 242 in the direction logic unit 138 to the "zero" state. The direction logic circuit thus initially produces negative output signals on both the F and R lines ($\overline{F}$ and $\overline{R}$ signal conditions within matrix 141) so that the logical conditions for direction, as interpreted by program unit 141, are as yet indeterminate.

But the initial A signal from sensing means 11 is also supplied to AND circuit 243. Because trigger circuit 241 has been set to the "zero" state as described above, and because trigger circuit 242 is in the "zero" state, the three input signal conditions necessary to afford a trigger signal from AND circuit 243 are present. Accordingly, trigger circuit 241 is actuated to its "one" operating condition, producing a positive output signal F that is supplied to the correspondingly identified input terminal of program unit 141 and thus effectively establishing a "forward" condition for the negative-is-true logic of the matrix. The $\overline{R}$ signal condition within matrix 141, on matrix line $i$, remains in effect; the logical signal condition is really "not reverse."

As indicated above, one of the signal conditions that is effective to produce a pulse output signal at terminal D$s$ of program unit 141 is $Ds = \overline{R} A \overline{E}$, where the $\overline{E}$ condition occurs on line $t$ of the program matrix. When the first A signal pulse is received, in the matrix, from sensing means 111, these signal conditions apply as will be apparent from the foregoing description.

As a consequence, and since counter flip-flop 220 has already been set to its "zero" state, this first stage of the reversible counter 121 is now actuated to its "one" operating condition to record the first wheel count in the counter. The change of state in flip-flop circuit 220 produces a positive going output signal at the "one" output of the flip-flop circuit and this signal is supplied to the D input terminal of program unit 141. As can be seen from FIG. 3, this D input signal appears, in the internal negative-is-true logic of the program unit, as a D signal on line $r$ and as a $\overline{D}$ signal on line $s$. From the equations given above, it can be seen that the initial A signal pulse from sensing means 111 also produces a reset signal Dr for the first flip-flop 220 in the reversible counter 121 but this signal cannot change the state of the flip-flop circuit because the flip-flop starts in its "zero" operating condition and, accordingly, the third input signal required for AND circuit 223 is not present.

The next action that takes place in counter circuit 110 is the sensing of the second wheel on the first car, it being assumed that this is the car 14 of FIG. 1 moving from from right to left as seen in that figure. This A signal pulse is effective to reset binary circuit 220, since the binary circuit is now in its "one" operating condition and, as noted above, $Dr=A$. The resetting of circuit 220 to its initial or "zero" condition again produces, within the negative logic circuit 141 of FIG. 3, the signal conditions of $\overline{D}$ on line $r$ and D on line $s$. In addition, as noted above, the A signal, when it occurs, coincides with an initial D signal condition on line $r$ of the program unit. Since $Es=A\ D$, the resulting signal supplied to AND circuit 224 sets the second stage flip-flop circuit of the reversible counter to its "one" state, recording a count of two in the counter. Change of state of this flip-flop circuit produces an E signal on line $l$ and a $\overline{E}$ signal on line $t$ of matrix 141, considered in terms of the negative logic of the program matrix. At the same time, a reset signal E$r$ is produced but this signal is ineffective because flip-flop circuit 221 is initially in its "zero" operating condition and the feedback signal from the "one" output of the flip-flop to AND circuit 225 is not available.

For a two axle truck, such as the first truck on car 14 (FIG. 1), the next significant condition in operation of counter 110 is the occurrence of a first signal from the second sensing means 112. This first B pulse signal is effective to reset flip-flop circuit 221 back to its "zero" state, since $Er=B$ as noted above. At the same time, a reset signal is developed on the matrix terminal D$s$ ($Ds=E\ B$), the E signal appearing on line $l$ of the matrix. Accordingly, flip-flop circuit 220 is again set to its "one" condition and the reversible counter is counted down one count. The first B pulse from sensing means 112 is also effective to set the first stage 230 of the unidirectional counter 122 to a count of one, since this signal is supplied to AND circuit 233 at a time when the flip-flop circuit 230 is already in its "zero" condition. As a consequence, an output signal is supplied to the M terminal of OR circuit 235 and hence to the $M+N$ terminal of program unit 141, but this produces no change in the other circuit conditions at this time.

When the second wheel of the first truck comes into alignment with pick-up coil 211 in the second sensing means 112 (FIG. 2), the pulse signal B that is produced affords a reset signal for the initial stage 220 of reversible counter 121; $Dr=\overline{R}\ B$. The resetting of binary circuit 220 to its "zero" condition removes the positive-going output signal from the D input terminal of matrix 141, restoring the initial operating condition for lines $r$ and $s$ within the matrix and signifying that the counter 121 has counted back to a zero count. Moreover, the B pulse signal supplied to AND circuit 234 in the input of unidirectional counter 122 resets the first flip-flop circuit 230 of this counter to its "zero" condition. This produces a pulse signal in the "zero" output of the flip-flop circuit that is applied to AND circuit 236 in the input of the second stage and sets counter 231 to its "one" condition. It is thus seen that a total count of two is recorded in the unidirectional counter 122. The output from the unidirectional counter is now the N signal.

At this point the conditions necessary to development of signal I$s$ are all present. That is, $Is=(M+N)\ P\ \overline{D}\ \overline{E}$ is a true condition within matrix 141 on matrix lines $n$, $q$, $s$, and $t$. Accordingly, binary circuit 157 is set to its "one" state, cutting off the $\overline{I}$ signal initially present and indicating a "between trucks" condition. Moreover, the appropriate signal conditions exist to provide an output signal on terminal K$s$, since $Ks=(M+N)\ \overline{D}\ \overline{E}$. Consequently, the reset circuit 161 is actuated to its "one" condition, affording an output signal K that resets all stages of counter 122 to the "zero" condition. The signal conditions for $Jr=(M+N)\ \overline{D}\ \overline{E}$ are also satisfied, and the "tag observed" circuit 159 is triggered to its "one" state to product a J signal that is applied to AND circuit 248.

Recording of the heading for the vehicle identification list has previously been triggered upon availability of the appropriate output signal, in this instance the F signal and the $\overline{R}$ signal, from direction logic 138. The control circuits for the recorder itself have not been illustrated in detail because they do not constitute a part of the present invention. However, it should be noted that recorder circuits do produce a number of signals that are utilized in control of counter apparatus 110 when the counter apparatus is incorporated in an automatic vehicle identification system.

Thus, when the recording of the heading for the list of identified vehicles is complete, this action is signalled to the counter apparatus by the presence of a RECORDED HEADING COMPLETE signal that is supplied to the negative AND circuit 248 in the input to program unit 141 (FIG. 2). Another signal supplied to the same AND circuit from the recorder is a TAG signal identifying the completion of scanning of the full complement of information from a particular identification member. The TAG signal is also applied to the input of AND circuit 253 in the TAG OBSERVED flip-flop 159.

When the recorder begins the recording of a particular vehicle identification, another signal is produced, indicated as a RECORD TAG signal that is supplied to the input of program unit 141 on line $k$ (FIG. 3). Yet another signal that is supplied from the recorder to the matrix 141, on line $w$, is a RECORD TAG SET signal signifying that a tag has been observed, after completion of heading recording and after recording of a complete previous identification number or the last digit of the heading. This particular signal occurs only in the presence of a TAG signal signifying the sensing of a full identification member. Moreover, it is inhibited when there has been a RECORD NO TAG output from circuit 158 or when the heading recording apparatus of the recorder has been initiated in operation.

One further signal derived from the recorder is a RECORD LAST POINT signal indicating the completion of a previous identification or heading recording, this signal constituting a reset signal for the RECORD NO TAG flip-flop 158. It will be understood that all of these recorder signals are derived from logic circuits that are consistent with counter apparatus 110 itself and that the particular kinds of circuits employed for this purpose are not critical to the present invention and are dependent in large part upon the construction and operation of the recording apparatus itself.

Completion of a recording operation is signified to program matrix 141 (FIG. 3) by the RECORD TAG signal on line $k$ and the RECORD TAG SET signal on line $w$. When the RECORD TAG signal has terminated, indicating that recording of identification has started, and the RECORD TAG SET signal appears, these coincident conditions produce, within the matrix, signals which are effective to reset the counter apparatus to a "between trucks" condition ready to sense the next truck, a second truck on the same vehicle, in a new cycle of operation. Thus, referring to the equations given above, it is seen that reset signals D$r$ and E$r$ are afforded to reset the reversible counter 121, upon occurrence of the RECORD TAG SET AND $\overline{\text{REC.}}\ \overline{\text{TAG.}}$ signals. The set signal for the "between trucks" flip-flop circuit 157, signal I$s$, is also present. And the signal K$s$ that actuates the reset flip-flop 161 is also available, providing for the resetting of unidirectional counter 122 and TAG OBSERVED circuit 159. This series of synchronizing signals is provided to assure re-synchronization of the counter apparatus each time a vehicle identification is actually recorded; they would not be necessary during ordinary operation of the counter apparatus but protect the apparatus against an error arising from a failure of one or more pulses in either of the counting operations performed by circuits 121 and 122.

Actuation of circuit 157 to its "between trucks" condition, as described above, is completed upon passage of the first truck of the vehicle as that truck passes through the sensing position defined by sensing means 111 and 112. In normal operation, and assuming a spacing between the second truck of the vehicle and the first truck of the next following vehicle, circuit 157 should be reset to its "zero" operating state, indicative of a "between cars" condition, upon movement of the second truck of the vehicle through the sensing position.

The sequence of operations in reversible counter 121 and in unidirectional counter 122 is the same for the second truck of the vehicle as it was for the first truck. Thus, the first wheel of the truck passing sensing means 111 produces an A pulse signal that is recorded as a count of one in stage 220 of reversible counter 121. The second wheel on this truck raises the count in the reversible counter to two. The first wheel on the truck, as it subsequently passes sensing means 112, produces a B pulse signal that causes reversible counter 121 to count down a single count and that is also recorded in unidirectional counter 122. The second pulse from sensing means 112 causes reversible counter 121 to return to zero and records a total count of two in unidirectional counter 122. Accordingly, as the second axle on the second truck clears the sensing position, there is a total count of two recorded in counter 122, producing an N signal but no P signal. Furthermore, there are no count-indicating outputs (D or E from counter 121. It is thus seen that the conditions for producing a reset signal $Ir$ are satisfied; $Ir = (M+N) \overline{P} \overline{D} \overline{E}$.

It will be recognized that the reset signal for between trucks flip-flop 157, the $Ir$ signal, is the same as the set signal $Is$ for that circuit. But the signal is effective only to reset the flip-flop circuit to its original "zero" condition because the circuit is already in its "one" state and the feedback signal from the "one" terminal is available to AND circuit 247 whereas there is no corresponding signal supplied to AND circuit 246. Accordingly, circuit 157 reverts to its original operating condition, producing an I signal indicative of a "between cars" condition instead of a "between trucks" condition.

To afford a further illustration of the operation of counter apparatus 110, functioning of the apparatus may be considered on the basis of the movement of a three truck car past the sensing means of the counter apparatus in a direction opposite that for the example given above. That is, consideration may be given to the functioning of the counter apparatus for a car such as car 15 (FIG. 1) having three axles per truck moving in a direction to pass sensing coil 211 before reaching sensing coil 201. Initially, it may be assumed that counter apparatus 110 has been energized and that the signal conditions given above, for program matrix 141, immediately after turn on, are applicable.

When the first wheel on the first truck of the car passes the magnetic pick up coil 211, a pulse output signal is produced on the B output of sensing means 112. The B pulse signal actuates AND circuit 244, previously set to the "zero" state, triggering circuit 242 to its "one" operating condition and producing a positive output signal R that is supplied to the R input of program unit 141. This establishes the fact that the car is moving in the arbitrarily designated reverse direction. In terms of signals actually present in the program matrix, the F signal on matrix line $j$ persists and the logical signal condition is "not forward."

As shown by the equations given above, one of the signal conditions for producing an output at terminal $Es$ of program unit 141 is $Es = F\ B\ D$. Thus, when the first B signal pulse is received in the matrix from sensing means 112, a set signal is supplied to the second stage 221 of reversible counter 121 which is driven from its "zero" state to its "one" operating condition in recording the first wheel count. That is, reversible counter 121 starts counting just as in the initial example given above, but it starts counting in the opposite direction because the vehicle being sensed is moving in the opposite direction. Moreover, the first B pulse is supplied to the input AND circuit 233 of counter 122 and the first wheel count is recorded in the unidirectional counter 122.

When the second wheel of the car passes pick-up coil 211, a B pulse is again produced. This pulse is supplied, through program unit 141, to the flip-flop circuit 221 in reversible counter 121 as a reset signal because, as noted above, $Er = B$. Resetting of circuit 221 to its "zero" condition again produces, in matrix 141, an $\overline{E}$ signal condition. Moreover, the B pulse signal coincides with the initial E signal condition on line $l$ of the matrix; since $Ds = E\ B$, circuit 220 is actuated to its "one" condition, recording a total of two in the reversible counter 121.

As noted above, the spacing S between the individual sensing means of the car counter apparatus (see FIG. 1) is slightly greater than the maximum intra-axle spacing T. Consequently, the first wheel of the three car truck reaches pickup coil 201 before the third wheel of the truck comes into alignment with pickup coil 211. It is thus seen that the next significant signal produced by the two sensing means 111 and 112 is an A signal from sensing means 111, which is now functioning as the second sensing means for the counter apparatus. This A pulse signal constitutes a reset signal for counter flip-flop 220, since $Dr = A$. Moreover, the A signal occurs at a time when a D signal is available from the reversible counter, satisfying the condition $Es = A\ D$. It is thus seen that the reversible counter counts back one count upon occurrence of the first A pulse.

Before the second A pulse is produced, the third wheel of the vehicles passes pickup coil 211, producing a third B pulse signal from sensing means 112. This B pulse signal again causes the reversible counter 121 to count to a total of two. Meanwhile, the total count in unidirectional counter 122, which is governed solely by the B pulse signals, reaches a level of three with each of the flip-flop circuits 230 and 231 set to its "one" condition.

Thereafter, a second pulse signal A is produced by sensing means 111 in response to movement of the second wheel of the truck past coil 201. As described above, the A pulse signal causes reversible counter 121 to count back one count, leaving a total of one count recorded in the reversible counter, in flip-flop 221. Finally, a third A pulse signal is produced, reducing the count in counter 121 to zero. At this point, the signal conditions are identical to those given above for a two wheel truck except that a count of three has been recorded in the unidirectional counter 122 and, accordingly, both of the M and N signals are available from that counter and are supplied to program unit 141. But this is a distinction without a difference because of the presence of OR circuit 235 in the input to program unit 141. A "between trucks" condition is established and the unidirectional counter 122 is reset in exactly the same manner as described above in connection with a two axle truck. Furthermore, the second truck of the vehicle is sensed and counted, as before, to restore the counter apparatus to a "between cars" condition.

As noted above, counter apparatus 110, when incorporated in an automatic vehicle identification system, provides for identification of the passage of a vehicle even though the vehicle does not carry an identifying tag. When this occurs, it is circuit 158 that signals the recorder to record a NO TAG indication. The RECORD NO TAG signal is produced by actuation of circuit 158 from its normal "zero" operating condition to its "one" operating condition.

The signal conditions necessary to actuate circuit 158 to produce a RECORD NO TAG indication are given in the last equation above, and may also be derived directly from the program matrix 141 as illustrated in FIG. 3. The first of these conditions is that there be a zero count in the reversible counter 121, indicated by $\overline{D}$ and $\overline{E}$ signal conditions on lines $s$ and $t$ of the matrix. If cars are moving through the system in a forward direction, an R signal is required to produce the actuating signal for the "no tag" flip-flop circuit 158. Moreover, an A pulse signal must be present, indicating that a new truck is moving into the counter apparatus at a time when no tag identification has been recorded.

Finally, there must be an output signal from the negative AND circuit 248 (FIGS. 2 and 3). This signal is present only when there is no $\overline{I}$ signal from the "between trucks" flip-flop 157, when there is no effective signal from the TAG OBSERVED flip-flop 159, when there is no TAG signal indicating sensing of the final digit of an identification member, and when there has been a previous recording of a complete heading. Stated differently, circuit 158 is set to its "one" condition to afford a RECORD NO TAG output signal to the recording apparatus when the count in counter 121 is zero, the vehicles are moving in a forward direction, a "between trucks" condition has been noted, no tag has been observed, a heading has previously been recorded, and a wheel is detected by sensing means 111. Actuation also occurs under the identical conditions, but with reverse movement of the vehicle, upon the development of a B pulse signal from the other sensing means 112. In either instance, the flip-flop 158 is reset to its initial condition as soon as the NO TAG indication has been recorded, as indicated by a RECORD LAST POINT input signal to AND circuit 252 (FIG. 2).

The TAG OBSERVED flip-flop circuit 159 is actuated from its normal zero condition to its "one" condition each time the scanning device identifies the last digit of a vehicle identification member, an event that is signalled by the appearance of a TAG input signal to AND circuit 253. The circuit is reset each time the reversible counter 121 is returned to zero and there is a count of two or three in unidirectional counter 122, as indicated by the relationship $Jr=(M+N)\overline{D}\overline{E}$. The output signal J from circuit 159 is used in control of the RECORD NO TAG flip-flop 158 as described above.

There remains for consideration the conditions presented by two vehicles having trucks quite close to the ends of the vehicles, with the spacing between the last axle of the lead truck and the first axle of the following truck, on the next vehicle, equal to or less than the minimum intra-truck axle spacing established for the vehicles. Taking the simplest example, in which each of the two adjacent vehicles has two axles per truck, and assuming that the vehicles are moving in the "forward" direction, the signal conditions for the two counters 121 and 122 change, with each pulse from the two sensing means 111 and 112, in the manner and in the sequence set forth in Table I.

TABLE I

| Sense pulse | Counter 121 | Counter 122 |
|---|---|---|
| A1 | D $\overline{E}$ | $\overline{M}$ $\overline{N}$ $\overline{P}$ |
| A2 | $\overline{D}$ $\overline{E}$ | $\overline{M}$ $\overline{N}$ $\overline{P}$ |
| B1 | D $\overline{E}$ | $\overline{M}$ $\overline{N}$ $\overline{P}$ |
| A3 | $\overline{D}$ $\overline{E}$ | M $\overline{N}$ $\overline{P}$ |
| B2 | D $\overline{E}$ | M $\overline{N}$ $\overline{P}$ |
| A4 | $\overline{D}$ $\overline{E}$ | $\overline{M}$ N $\overline{P}$ |
| B3 | D $\overline{E}$ | $\overline{M}$ N $\overline{P}$ |
| B4 | $\overline{D}$ $\overline{E}$ | $\overline{M}$ $\overline{N}$ P |

From the table it may be seen that during the passage of the two trucks the reversible counter 121 never reaches the "zero" condition $(\overline{D}\ \overline{E})$ until both trucks have passed. Consequently, there has been no resetting of the "between trucks" circuit 157. Moreover, no resetting of the TAG OBSERVED circuit 159, as under normal circumstances, occurs, since the usual conditions for these actions, each requiring a zero count in counter 121, have not been reached.

As the last wheel of the second vehicle is sensed, producing the fourth B pulse, the alternate conditions for signals K$s$ and J$r$, however, are satisfied. That is, there is a P signal present indicating a count of more than three in the unidirectional counter, and the count in the reversible counter is zero. Under these circumstances, reset flip-flop 161 is actuated to its "one" condition and, on the next cycle of the clock signal, is reset to its "zero" condition, producing an output signal K that resets the unidirectional counter 122 to zero. And the same signal conditions produce a signal J$r$ that actuates circuit 159 to its "one" condition to indicate the operating condition for observance of a tag. It is thus seen that the counter apparatus is re-synchronized, to a "between trucks" condition, for the passage of two trucks together as required for effective operation of the system; if this were not done, the counter could treat the two trucks as a single truck and would be out of synchronization for further operations.

The counter apparatus of the invention is relatively simple and inexpensive in construction, operating on the basis of but two sensing means, yet is highly effective and efficient in determining the passage of two-truck vehicles which may have either two or three axles per truck. The apparatus affords an accurate and effective determination of the direction of vehicle movement. Moreover, when incorporated in an automatic vehicle identification system, the counter apparatus enables such a system to distinguish effectively between vehicles bearing identification numbers and other vehicles which do not carry identification numbers, permitting the system to record the passage of both kinds of vehicle.

Hence, while preferred embodiments of the invention have been described and illustrated, it is to be understood that they are capable of variation and modification.

I claim:

1. A vehicle counter apparatus for counting vehicles having two trucks each with each truck including no more than three axles, as said vehicles traverse a given path section, said counter comprising:

a pair of sensing means, each for sensing passage of a vehicle axle, spaced from each other along said path section by a distance greater than the maximum spacing between axles of a single truck but less than the minimum spacing between trucks;

a reversible counter having a capacity of at least two;

a unidirectional counter having a capacity of at least four;

direction means, coupled to said sensing means, for determining the direction of movement of vehicles traversing said path section;

program means, actuated by said direction means, for coupling one of said sensing means to said unidirectional counter, for coupling the first of said sensing means to be actuated to said reversible counter to cause said reversible counter to count in one direction and for coupling the second sensing means to be actuated to said reversible counter to cause said reversible counter to count in the opposite direction;

and logic means, coupled to said program means, for signalling passage of a vehicle truck whenever the count in said reversible counter is zero and the count in said unidirectional counter is less than four.

2. A vehicle counter apparatus according to claim 1, in which said program means further includes additional logic means for signalling the passage of two trucks of adjacent vehicles whenever the count in said reversible counter is zero and the count in said unidirectional counter is greater than three.

3. A vehicle counter apparatus according to claim 1 in which said program means comprises a two-pole double-throw switch actuated by said direction logic means.

4. A vehicle counter apparatus according to claim 1 in which said program means and said logic means comprise a single unified diode matrix.

5. A vehicle counter apparatus according to claim 2 in which said program means, said logic means, and said additional logic means comprise a single unified diode matrix.

6. An automatic vehicle identification system for identifying and counting vehicles having two trucks each with each truck including no more than three axles, as said vehicles traverse a given path section, said system comprising:
  scanning means for scanning individual identification members on vehicles traversing said given path section;
  a pair of sensing means, each for sensing passage of a vehicle axle, spaced from each other along said path section by a distance greater than the maximum spacing between axles of a single truck but less than the minimum spacing between trucks;
  a reversible counter having a capacity of at least two;
  a unidirectional counter having a capacity of at least four;
  direction logic means, coupled to said sensing means, for determining the direction of movement of vehicles traversing said path section;
  program means, coupled to said scanning means and to said direction logic means, for coupling both said sensing means to said reversible counter to cause said reversible counter to count in opposite directions in response to signals from the different sensing means;
  coupling means coupling one of said sensing means to said unidirectional counter;
  logic means, included in said program means, for signalling passage of a vehicle truck whenever the count in said reversible counter is zero and the count in said unidirectional counter is greater than zero and less than four;
  means for actuating said scanning means the first time said logic means signals the passage of a vehicle truck; and
  means for subsequently actuating said scanning means each time said logic means signals the passage of two additional trucks.

7. An automatic vehicle identification system according to claim 6 and further comprising:
  additional logic means for signalling the passage of two trucks of adjacent vehicles whenever the count in said reversible counter is zero and the count in said unidirectional counter is greater than three;
  and means for actuating said scanning means each time said additional logic means signals the passage of two trucks from adjacent vehicles.

8. An automatic vehicle identification system according to claim 6 and further comprising:
  recording means, coupled to said scanning means, for recording identification data for each identification member scanned;
  and means, included in said program means, for resetting both of said counters each time the identification data for a car is recorded.

9. An automatic vehicle identification system according to claim 8 and further comprising:
  additional logic means for signalling the passage of two trucks of adjacent vehicles whenever the count in said reversible counter is zero and the count in said unidirectional counter is greater than three;
  and means for actuating said scanning means each time said additional logic means signals the passage of two trucks from adjacent vehicles.

10. An automatic vehicle identification system according to claim 8 and further comprising:
  further logic means, included in said program means and coupled to said sensing means, for developing an actuating signal when a second truck of a vehicle enters said given path section with no identification member having been scanned;
  and means for applying said actuating signal to said recording means to record passage of an unidentified vehicle.

11. A vehicle counter apparatus for counting vehicles having two trucks each with each truck including no more than $n$ axles, as said vehicles traverse a given path section, said counter comprising:
  a pair of sensing means, each for sensing passage of a vehicle axle, spaced from each other along said path section by a distance greater than the maximum spacing between axles of a single truck but less than the minimum spacing between trucks;
  a reversible counter having a capacity of at least $n$;
  a unidirectional counter having a capacity of at least $n+1$;
  direction logic means, coupled to said sensing means, for determining which sensing means is the first to sense the presence of a vehicle axle, thereby to establish the direction of movement of a vehicle cut traversing said path section;
  counter control means, actuated by said direction logic means, for coupling said first sensing means to said reversible counter to cause said reversible counter to count in one direction, for coupling the other sensing means to said unidirectional counter, and further for coupling said other sensing means to said reversible counter to cause said reversible counter to count in the opposite direction;
  and program means comprising first signalling means for signalling passage of one vehicle truck whenever the count in said reversible counter is zero and the count in said unidirectional counter is no greater than $n$;
  said program means including reset means for resetting both counters.

References Cited

UNITED STATES PATENTS 2,899,544  8/1959  Marquardt __________ 246—77
3,372,267  3/1968  Bramer et al.
3,274,384  9/1966  Robison.

MAYNARD R. WILBUR, Primary Examiner

ROBERT F. GNUSE, Assistant Examiner

U.S. Cl. X.R.

246—77, 247; 340—146.3